United States Patent [19]

Appleman et al.

[11] 4,045,585
[45] Aug. 30, 1977

[54] FLAVORED ANIMAL FOOD COMPOSITIONS

[75] Inventors: Milo D. Appleman, Los Angeles; Stanislao A. DeSantis, Rolling Hills, both of Calif.

[73] Assignee: Decel Corporation, Los Angeles, Calif.

[21] Appl. No.: 688,085

[22] Filed: May 19, 1976

[51] Int. Cl.$^2$ ............................................. A23K 1/00
[52] U.S. Cl. .................................. 426/331; 426/532; 426/558; 426/630; 426/650; 426/656; 426/657; 426/805
[58] Field of Search ............... 426/558, 805, 331, 335, 426/532, 542, 623, 549, 630, 632, 334, 445, 446, 656, 657, 650

[56] References Cited

U.S. PATENT DOCUMENTS

| 3,852,483 | 12/1974 | Oborsh et al. | 426/549 X |
| 3,946,123 | 3/1976 | Hanna | 426/805 X |

*Primary Examiner*—R. B. Penland
*Attorney, Agent, or Firm*—Donald Diamond

[57] ABSTRACT

A coherent and physically stable, flavored animal food composition adapted to be used in the preparation of canned or expanded pet foods is prepared by blending and mixing a formulation containing flour, moisture, fat and comminuted natural flavor material such as cheese, poultry, fish, kidney, liver and mixtures thereof to obtain a uniform dispersion of the same in a dough-like mass. Liquid whole egg may be employed as the moisture source and the composition may be further formulated with a stabilizer, preservative, protein adjuncts and coloring.

19 Claims, No Drawings

FLAVORED ANIMAL FOOD COMPOSITIONS

BACKGROUND OF THE INVENTION

This invention relates to animal food compositions and, more particularly, to coherent and stable, flavored animal food compositions adapted to be used in the preparation of canned or expanded pet foods.

In the preparation of canned pet foods, it would be advantageous to include in the formulation a natural flavor material such as cheese. However, when cheese in chunk, pellet or finely divided form is blended into the pet food formulation and the resulting composition is thereafter canned and retorted at, for example, 250° F (121° C) for 70 minutes, the cheese initially melts and upon cooling solidifies with adherence to the other ingredients which are present. Thus, the melting and solidification of the cheese during the canning process alters and changes the physical form of the pet food from a discontinuous, particulate type system to a continuous, matrix type system.

Accordingly, the principal object of this invention is to provide a coherent and stable, flavored animal food composition which is adapted to be used in the preparation of canned or expanded pet foods and which maintains its physical integrity during the heat treating steps in the processing of such foods.

SUMMARY OF THE INVENTION

In accordance with one aspect of this invention, there is provided a coherent and stable, flavored animal food composition adapted to be used in the preparation of canned or expanded pet foods which comprises: flour from about 50 to about 75 wt. %, moisture from about 18 to about 30 wt. %, fat from about 2 to about 10 wt. %, and comminuted natural flavor material selected from the group consisting of cheese, poultry, liver, kidney, fish and mixtures thereof, said natural flavor material being fresh, dried or mixtures thereof in an amount at least sufficient to impart flavor to the composition with the upper limit thereof being about 25 wt. % providing, however, that the upper limit for dried natural flavor material is about 12.5 wt. %.

In a second aspect of this invention, there is provided a process for preparing a coherent and stable, flavored animal food composition adapted to be used in the preparation of canned or expanded pet foods which comprises: blending a mixture containing — flour from about 50 to about 75 wt %, moisture from about 18 to about 30 wt. %, fat from about 2 to about 10 wt. %, and comminuted natural flavor material selected from the group consisting of cheese, fish, poultry, liver, kidney and mixtures thereof, said natural flavor material being fresh, dried or mixtures thereof in an amount at least sufficient to impart flavor to the composition with the upper limit thereof being about 25 wt. % providing, however, that the upper limit for dried natural flavor material is about 12.5% — to obtain a uniform dispersion thereof in a dough-like mass.

DETAILED DESCRIPTION

COMPOSITION

The flours which can be used in the flavored animal food composition include, for example, corn flour, wheat flour, soy flour, rice flour and mixtures thereof with the selection of the particular flour to be empolyed being determined primarily by economic considerations. Flour is generally present in an amount from about 50 to about 75 wt. % with a preferred range being from about 60 to about 70 wt. %.

When the flavored animal food composition is to be held in the moist form for any appreciable period of time, a preservative is advantageously added to the formulation to prevent deterioration and spoilage. The preservatives which can be utilized in the compositions of this invention comprise antimicrobial agents as, for example, sorbic acid, sorbates such as potassium sorbate, propionates such as calcium proprionate, and lower alkyl esters of para-hydroxy benzoic acid such as the methyl, ethyl, propyl and butyl esters of parahydroxy benzoic acid. Preservative is generally present in an amount from about 0.05 to about 0.2 wt. % and preferably in an amount from about 0.08 to about 0.1 wt. %.

Fat is advantageously included in the formulation to impart lubricity to the composition. The fatty compositions which can be employed include pet edible animal and vegetable fats and oils such as soybean oil, cottonseed oil, sesame oil, olive oil, corn oil, fish oil, grease, tallow, beef fat and the like. Fat is generally present in an amount from about 2 to about 10 wt. % with a preferred range being from about 3 to about 4 wt. %.

The comminuted natural flavor materials which are employed in the animal food compositions include cheese, fish, poultry, liver, kidney and mixtures thereof. The natural flavor materials may be fresh or dried or a mixture of fresh and dried materials. Natural flavor material is used in an amount which is at least sufficient to impart flavor to the composition while the upper limit thereof generally does not exceed about 25 wt. % providing, however, that the upper limit for dried natural flavor material is about 12.5 wt. %. The lower limit for fresh cheese is about 2 wt. %, the lower limit for fresh fish is about 5 wt. % and the lower limit for each of fresh poultry, fresh kidney and fresh liver is about 10 wt. %, while the lower limit for dried natural flavor material is about 2.5 wt. %. Thus, the range for ingredients comprising the natural flavor materials is generally as follows: fresh cheese from about 2 to about 25 wt. %, fresh fish from about 5 to about 25 wt. %, each of fresh poultry, fresh liver and fresh kidney from about 10 to about 25 wt. % and each of dried cheese, dried fish, dried poultry, dried kidney and dried liver from about 2.5 to about 12.5 wt. %.

Moisture is generally present in the formulation in an amount from about 18 to about 30 wt. % with a preferred range being from about 22 to about 26 wt. %. The source of moisture may be water, liquid whole egg or mixtures thereof. In addition, fresh natural flavor materials, when used, contribute moisture to the formulation since fresh products such as chicken, kidney, liver and tuna contain approximately 70 per cent moisture. It is highly advantageous to use liquid whole egg as the source of moisture, since liquid egg not only contributes moisture to the formulation but is a source of abluminous materials which help stick the ingredients together during the processing thereof.

The protein content of the flavored animal food composition can be increased by including in the formulation one or more portein adjuncts such as cell cream, dried whey or mixture thereof. Cell cream, also known as Biological Fermentation Products, is the spray-dried residue from the production of monosodium glutamate which has approximately 75 per cent protein. Cell cream can be employed in an amount from about 8 to about 15 wt. % and dried whey can also be used in the composition in an amount from about 8 to about 15 wt. %.

The composition may also be formulated with a cellulosic stabilizer in an amount from about 1 to about 6 wt. %. The cellulosic stabilizers which can be used include cellulosic gums and alginates such as sodium carboxymethylcellulose and sodium alginate.

Salt can be added to the formulation in an amount from about 0.5 to about 1.5 wt. % with a preferred range being from about 1 to about 1.3 wt. %. Coloring may be used in the composition to impart a suitable color thereto.

PROCESS

The flavored animal food compositions of this invention are prepared by mixing and blending the aforesaid ingredients in about the proportions set forth to obtain a uniform dispersion thereof in a dough-like mass. The mixing and blending step can be carried out in a dough mixer, ribbon blender or any other suitable mixer or blender. In an illustrative procedure, the dry ingredients are initially mixed for about 2 minutes and then the fluid ingredients are added thereto and mixing and blending are continued for about 5 to about 10 minutes. Fresh natural flavor materials, namely, cheese, fish, chicken, liver and kidney may be comminuted prior to the mixing step by passing the same through an emulsifier or subjecting the same to fine grinding or, if a suitable mixer is employed, the fresh natural flavor materials may be comminuted during the mixing step. If the fat utilized in the process is a solid at room temperature, it is heated and melted and added to the mixture in fluid form.

The product of the mixing step, which contains approximately 18 to 30 per cent moisture, can be stored for several weeks or shipped at ambient temperature if, during the mixing step, the mix is sufficiently heated so as to destroy micro organisms present in the mixture, otherwise the product must be stored or shipped under refrigeration.

The flavored animal food compositions of this invention are adapted to be extruded in ribbon form and cut or pressed into chunks, pellets or flakes for use in the preparation of finished pet foods. When the flavored composition is to be used in the preparation of canned pet foods, it is, for example, added, in chunk or pellet form, to a regular pet food formulation in an amount from about 3 to about 10 wt. % which is then canned and retorted for a length of time dependent upon contents, usually 70 minutes at 250° F (121° C). The chunks or pellets may advantageously be air dried to a moisture content of about 15% before being used in the preparation of the canned pet food. It has been found that the flavored chunks and pellets of this invention maintain their shape, form and general physical integrity during the thermal treating step of the canning process.

In another end use application, the flavored compositions of this invention in, for example, undried flake form can be passed through an expander in which the heat and steam will produce an expanded type pet food.

EXAMPLES

The following examples further illustrate the invention. In each of the examples, the flavored animal food compositions were prepared by initially mixing the dry ingredients for about 2 minutes and then adding the fluid ingredients with continued mixing for about 5 to 10 minutes to obtain a uniform dispersion of ingredients in a dough-like mass. As to the fluids, the moisture source was added to the mixer first and then the tallow, which had been heated and melted, was added to the mixer in fluid form.

EXAMPLE I

This example illustrates cheese flavored compositions prepared with and without the use of sodium carboxymethylcellulose (CMC) as a stabilizer and which contained the following ingredients:

| Ingredients | 1A lbs. | 1B lbs. |
|---|---|---|
| Wheat Flour | 150 | 150 |
| Soy Flour | 18 | 22 |
| CMC | 4 | — |
| Dry Cheese | 8 | 8 |
| Fresh Cheese | 6 | 6 |
| Salt | 3 | 3 |
| Yellow #6 | 0.59 | 0.59 |
| Yellow #5 | 0.22 | 0.22 |
| Potassium sorbate | 0.28 | 0.28 |
| Calcium proprionate | 0.28 | 0.28 |
| Water | 40 | 40 |
| Tallow | 8 | 8 |

Each of the formulations had a moisture content of approximately 24.5 to 26 wt. %. Following the mixing step, the products were extruded as ribbons and formed into chunks, pellets and flakes. A part of each formulation was dried to approximately 15 per cent moisture. The dried and undried products of Formulations 1A and 1B were added to separate samples of a standard pet food formula which were then canned and retorted at 250° F for 70 minutes. It was found that the products dried to about 15 percent moisture held their integrity better than the undried products and that the products formulated with CMC maintained greater integrity of shape. When the undried flavor compositions are put through an expander, they puff into an esthetically pleasing, yellowish pet food.

EXAMPLE II

This example illustrate chicken flavored compositions and liver flavored compositions prepared from comminuted whole chicken and comminuted liver. The formulations, in general, were similar to those of Example I except that 40 pounds of chicken, in one case, and 40 pounds of liver, in the other case, were substituted for cheese. The only compensation made was in moisture. Since fresh chicken and fresh liver contain, individually, approximately 70 percent moisture, it was only necessary to add 11 pounds of water instead of 40 pounds of water as in Formulations 1A and 1B.

| Ingredients | 2A lbs. | 2B lbs. | 2C lbs. | 2D lbs. |
|---|---|---|---|---|
| Wheat Flour | 150 | 150 | 150 | 150 |
| Soy Flour | 18 | 18 | 18 | 18 |
| CMC | 4 | — | 4 | — |
| Chicken | 40 | 40 | — | — |
| Liver | — | — | 40 | 40 |
| Salt | 3 | 3 | 3 | 3 |
| Potassium Sorbate | 0.28 | 0.28 | 0.28 | 0.28 |
| Calcium Propionate | 0.28 | 0.28 | 0.28 | 0.28 |
| Water | 11 | 11 | 11 | 11 |
| Tallow | 8 | 8 | 8 | 8 |

The results attained upon canning with a standard pet food formulation were similar to those in Example I.

EXAMPLE III

This example illustrates flavored animal food compositions using liquid whole egg (which contains approximately 75% moisture) as the moisture source and illustrates the use of cell cream, a protein adjunct, in the compositions.

| Ingredients | 3A lbs. | 3B lbs. |
|---|---|---|
| Wheat Flour | 100 | 50 |
| Soy Flour | 18 | 18 |
| Corn Flour | — | 50 |
| CMC | 4 | — |
| Dry Cheese | 8.5 | 4.5 |
| Fresh Cheese | 12.5 | 6.0 |
| Salt | 3.25 | 2.75 |
| Yellow #6 | 0.59 | 0.59 |
| Yellow #5 | 0.22 | 0.22 |
| Cell Cream | 10 | 10 |
| Potassium Sorbate | 0.28 | 0.28 |
| Liquid Whole Egg | 60 | 40 |
| Tallow | 8 | 8 |

The results attained upon canning with a standard pet food formulation, while similar to those obtained in Example I, were, however, more effective and more palatable than those of Example I.

EXAMPLE IV

A series of 1 kilogram batches of flavored compositions were prepared containing varying comminuted flavored materials in the fresh or dried form. Liquid whole egg was employed as the moisture source and its concentration was dependent upon whether fresh or dried flavored materials were used, since fresh flavored materials contain about 70 percent moisture while dry flavored materials contain about 5 percent mositure. Dried whey, which has a good pattern of amino acids and vitamins, was included in the formulations. The formulations for the 1 kilogram batches were as follows:

| Ingredients | 4A Fresh* Chicken | 4B Fresh* Liver | 4C Dried* Liver | 4D Fresh* Kidney | 4E Dried* Kidney | 4F Fresh* Scrap Tuna | 4G Tuna* Solids |
|---|---|---|---|---|---|---|---|
| | | | Per Cent by Weight | | | | |
| *Flavor | 20 | 20 | 10 | 20 | 10 | 20 | 10 |
| Liquid Egg | 5.9 | 5.9 | 20 | 5.9 | 20 | 5.9 | 20 |
| Corn Flour | 20 | 20.5 | 23 | 20.5 | 23 | 20.5 | 23 |
| Wheat Flour | 22.5 | 22 | 22.4 | 22 | 22.4 | 22 | 22.4 |
| Cell Cream | 11.5 | 11.5 | 8 | 11.5 | 8 | 11.5 | 8 |
| Whey | 15 | 15 | 11.5 | 15 | 11.5 | 15 | 11.5 |
| Salt | 1.3 | 1.3 | 1.3 | 1.3 | 1.3 | 1.3 | 1.3 |
| Potassium Sorbate | 0.1 | 0.1 | 0.1 | 0.1 | 0.1 | 0.1 | 0.1 |
| Calcium Propionate | 0.1 | 0.1 | 0.1 | 0.1 | 0.1 | 0.1 | 0.1 |
| Tallow | 3.6 | 3.6 | 3.6 | 3.6 | 3.6 | 3.6 | 3.6 |

Formulations 4A through 4G comprised dough-like masses which were particularly well suited for extrusion and forming into chunks, pellets and flakes for use in the preparation of canned or expanded pet foods.

The products made with fresh poultry, fresh liver and fresh kidney should be heated to destroy microorganisms which might cause spoilage and deterioration of the product.

In view of the foregoing description and examples, it will become apparent to those of ordinary skill in the art that equivalent modifications thereof may be made without departing from the spirit and scope of this invention.

That which is claimed is:

1. A coherent and physically stable, flavored animal food composition adapted to be used in the preparation of canned or expanded pet foods which consists essentially of:
    flour from about 50 to about 75 wt. %, moisture from about 18 to about 30 wt. %, fat from about 2 to about 10 wt. %, and
    comminuted natural flavor material selected from the group consisting of cheese, poultry, liver, kidney, fish and mixtures thereof, said natural flavor material being fresh, dried or mixtures thereof in an amount at least sufficient to impart flavor to the composition with the upper limit thereof being about 25 wt. % providing, however, that the upper limit for dried natural flavor material is about 12.5 wt. %.

2. A composition according to claim 1 wherein the concentration range for flour is from about 60 to about 70 wt. % and the concentration range for moisture is from about 22 to about 26 wt. %.

3. A composition according to claim 1 wherein flour is a member selected from the group consisting of corn flour, wheat flour, soy flour, rice flour and mixtures thereof.

4. A composition according to claim 1 wherein moisture is derived from water, liquid whole egg and mixtures thereof.

5. A composition according to claim 1 wherein fat is a member selected from the group consisting of pet edible, animal and vegetable fats and oils and mixtures thereof.

6. A composition according to claim 1 which further consists essentially of a preservative selected from the group consisting of sorbic acid, potassium sorbate, calcium propionate, lower alkyl esters of para-hydroxybenzoic acid and mixtures thereof in an amount from about 0.05 to about 0.2 wt. %.

7. A composition according to claim 1 which further consists essentially of a protein adjunct selected from the group consisting of cell cream in an amount from about 8 to about 15 wt. %, dried whey in an amount from about 8 to about 15 wt. % and mixtures thereof.

8. A composition according to claim 1 which also includes from about 1 to about 6 wt. % of a cellulosic stabilizer.

9. A composition according to claim 1 wherein the lower limit for fresh cheese is about 2 wt. %, the lower limit for fresh fish is about 5 wt. % and the lower limit for each of fresh poultry, fresh liver and fresh kidney is about 10 wt. %.

10. A composition according to claim 1 wherein the lower limit for the dried natural flavor material is about 2.5 wt. %.

11. A process for preparing a coherent and physically stable, flavored animal food composition adapted to be used in the preparation of canned or expanded pet foods which consists essentially of blending a mixture containing flour from about 50 to about 75 wt. %, moisture from about 18 to about 30 wt. %, fat from about 2 to about 10 wt. %, and comminuted natural flavor material selected from the group consisting of cheese, fish, poultry, liver, kidney and mixtures thereof, said natural flavor material being fresh, dried or mixtures thereof in an amount at least sufficient to impart flavor to the composition with the upper limit thereof being about 25 wt. % providing, however, that the upper limit for dried natural flavor material is about 12.5 wt. %, to obtain a uniform dispersion thereof in a dough-like mass.

12. A process according to claim 11 wherein the concentration range for flour is from about 60 to about 70 wt. % and the concentration range for moisture is from about 22 to about 26 wt. %.

13. A process according to claim 11 wherein flour is a member selected from the group consisting of corn flour, wheat flour, soy flour, rice flour and mixtures thereof.

14. A process according to claim 11 wherein moisture is derived from water, liquid whole egg and mixtures thereof.

15. A process according to claim 11 wherein the mixture further consists essentially of a protein adjunct selected from the group consisting of cell cream in an amount from about 8 to about 15 wt. %, dried whey in an amount from about 8 to about 15 wt. % and mixtures thereof.

16. A process according to claim 11 wherein the mixture further consists essentially of from about 1 to about 6 wt. % of a cellulosic stabilizer.

17. A process according to claim 11 wherein the mixture further consists essentially of a preservative selected from the group consisting of sorbic acid, potassium sorbate, calcium proprionate, lower alkyl esters of para-hydroxybenzoic acid and mixtures thereof in an amount from about 0.05 to about 0.2 wt. %.

18. A process according to claim 11 wherein the lower limit for fresh cheese is about 2 wt. %, the lower limit for fresh fish is about 5 wt. % and the lower limit for each of fresh poultry, fresh liver and fresh kidney is about 10 wt. %.

19. A process according to claim 11 wherein the lower limit for the dried natural flavor material is about 2.5 wt. %.

* * * * *